United States Patent

[11] 3,530,760

[72] Inventor Robert O. Lindstrand
 Rockford, Illinois
[21] Appl. No. 800,784
[22] Filed Nov. 8, 1968
 Continuation-in-part of Ser. No. 524,072,
 Feb. 1, 1966, abandoned.
[45] Patented Sept. 29, 1970
[73] Assignee Keystone Consolidated Industries Inc.
 Peoria, Illinois
 a corporation of Delaware

[54] THREAD-FORMING SCREW
 2 Claims, 5 Drawing Figs.
[52] U.S. Cl. .................................................... 85/46,
 10/10, 85/48, 151/22
[51] Int. Cl. ....................................................... F16b 33/02,
 F16b 39/30
[50] Field of Search ........................................... 85/47, 48,
 41, 46; 10/10, 152 (Swaging Taps); 151/22

[56] References Cited
 UNITED STATES PATENTS
2,352,982 7/1944 Tomalis ........................ 85/48X
3,195,156 7/1965 Phipard ........................ 85/47X
 FOREIGN PATENTS
 628,857 6/1963 Belgium ..................... 85/47

Primary Examiner—Ramon S. Britts
Attorney—Wilson and Geppert

ABSTRACT: A thread-forming screw having a generally pentagonal shape with an enlarged head at one end and a tapered thread-forming free end. The screw is pentagonal throughout its length having five lobes running longitudinally the entire length of the screw shank with a relief area behind each lobe. The screw has a constant root diameter and the lobes have threads of full depth with sharp crests while the relief areas have threads of non-uniform depth. On the tapered thread-forming end, the root diameter of the thread remains constant while the threads on the lobes decrease in depth and have progressively flattened and concave crests and the relief areas increase in area and decrease in thread depth.

Patented Sept. 29, 1970

3,530,760

Inventor:
Robert O. Lindstrand

By Wilson & Geppert

Attorneys 3,530,760

THREAD-FORMING SCREW

The present application is a continuation-in-part of my copending application Ser. No. 524,072, filed Feb. 1, 1966, now abandoned.

The present invention relates to a novel self-tapping or thread-forming screw and more particularly to a generally five-sided screw to provide ease in driving where heavy plating is utilized on the screw or if the screw is used in zinc or aluminum die castings where the screw must form a thread in blind cored holes.

Among the objects of the present invention is the provision of a novel thread-forming screw having a generally pentagonal shape with five lobes which run longitudinally the complete length of the threaded portion. Behind each lobe is flat or relief area which provides relief for heavy plating or soft galling materials such as zinc or aluminum. In a screw having a full 360° thread without the above relief areas where heavy plating is used on the screw, the drive torque for the screw will, in some cases, exceed the minimum torsional strength of the screw. This will not occur with the present screw.

Another object of the present invention is the provision of a screw having a pentagonal shape where a thread is rolled thereon. The blank is of a generally pentagonal shape and the thread-rolling operation provides five lobes having threads of full depth at the corners of the pentagon and five intermediate relief areas having threads of non-uniform depth. The threads at the lobes are sharp while the threads on the flats between the lobes are not sharp and give an elongated elliptical appearance.

A further object of the present invention is the provision of a five-lobed, thread-forming screw which has a holding power or tension providing resistance to loosening or backing out of the screw from the workpiece under vibration or other forces. This screw also has a favorable initial driving torque and develops higher stripping torques than comparable commercially available thread-forming screws.

The present invention also comprehends the provision of a pentagon-shaped screw having a tapering free end to aid in the introduction and alignment of the screw in the opening in the workpiece.

Further objects are to provide a construction of maximum simplicity, efficiency, economy and ease of assembly, and such further objects, advantages and capabilities as will later more fully appear and are inherently possesed thereby.

Figure 1:
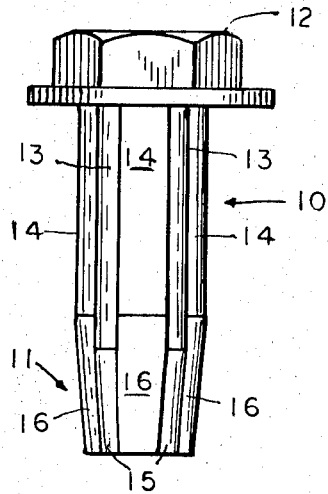
FIG. 1 is a side elevational view of the pentagonal shaped blank prior to threading.
Figure 2:
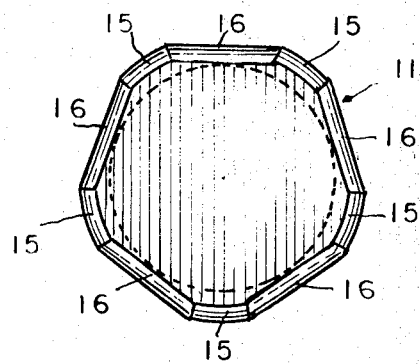
FIG. 2 is an enlarged end elevational view of the free end of the blank opposite the head.

Referring more particularly to the disclosure in the drawing wherein is shown an illustrative embodiment of the present invention, FIGS. 1 and 2 disclose a wire rod which has been headed and extruded to form the pentagonal-shaped blank 10. The blank 10 has a tapered end 11 at one end and an enlarged head 12 at the opposite end. The blank 10 is formed with five rounded corners 13 and five flattened sides 14 intermediate the corners 13. The tapered end 11 is also provided with rounded corners 15 and flattened sides 16. The tapered end 11 provides for maximum efficiency in providing proper alignment and for ease of entrance and starting of the screw in a hole.

Figure 4:
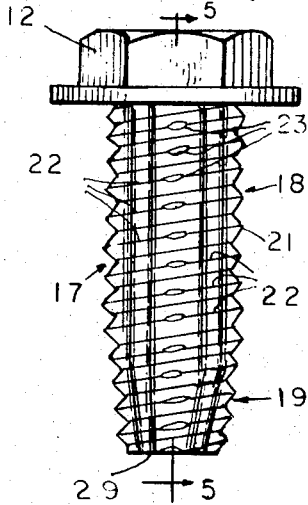
FIG. 4 is a side elevational view of the threaded screw of FIG. 3.
Figure 3:
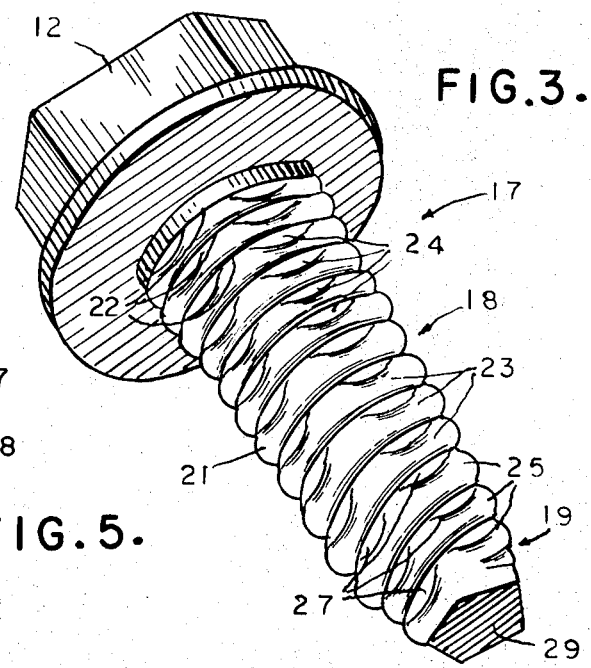
FIG. 3 is an enlarged perspective view of a threaded screw showing the lobes and the relief areas.
Figure 5:
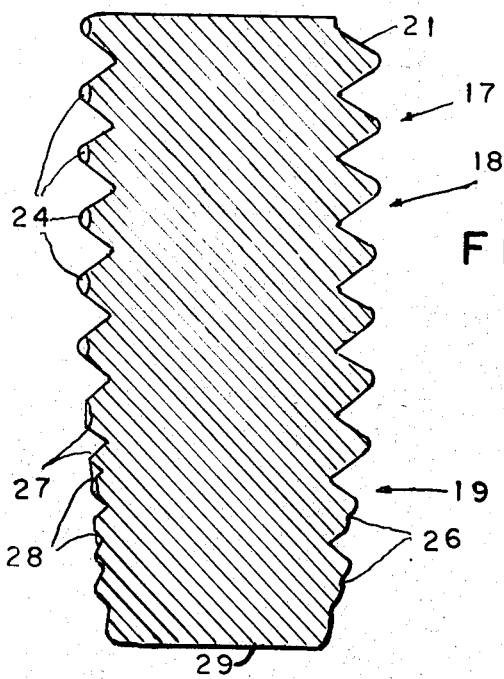
FIG. 5 is an enlarged partial vertical cross sectional view of the formed screw taken on the line 5—5 of FIG. 4.

After the blank 10 has been formed to the desired pentagonal configuration, the blank has a thread rolled thereon by a pair of standard rolling dies to form the screw 17 shown in FIGS. 3, 4 and 5. The screw includes a body portion 18 and a tapered end 19 having a generally continuous thread 21 formed thereon by the rolling operation. The screw is provided with five lobes 22 as set forth in cross section for each revolution or convolution of the screw thread and five relief areas or flats 23 intermediate the lobes. The lobes and relief areas are formed along the entire length of the screw 17 from the tapered tip 19 to the adjacent enlarged head 12.

The threaded shank has a constant circular root diameter for the thread, and the threads on the lobes 22 are of full depth while the threads on the relief areas 23 decrease from full depth adjacent the lobe to a depth substantially less than the full depth. The threads in the relief areas 23 are formed with partial concave crests at 24 having a generally elliptical periphery but with substantially pointed ends. At the tapered end 19, the threads on the lobes 25 gradually are reduced in depth toward the free end of the screw with the lobes having crests which gradually become concave as at 26 as the thread depth decreases. Also, the relief areas 27 of the tip 19 gradually are reduced in depth and the concave crests 28 gradually become more deeply concave and more elongated and approach nearer the lobes as the free end 29 of the screw is approached.

The present screw was designed to provide the relief required for easy assembly in zinc and aluminum die castings and in steel applications where a thick plating is required on the screw for corrosion resistance. Also, the screw is utilized to form a thread in blind cored holes. Where a screw has a full 360° thread without relief areas and when heavy plating is used, the drive torque for the screw will in some cases exceed the minimum torsional strength of the screw. However, in the present screw, the generally flat relief area behind each lobe provides a place for soft materials, such as zinc or aluminum and heavy plating to gather and ride free, thus reducing friction, i.e. providing the relief required for ease in assembly. Thus, the thread is swaged in the workpiece rather than being cut into the metal thereof.

On the present thread-forming screw 17, the relief areas 23 have a generally constant concavity along the screw shank from the head 12 to the tip 19, until the concavity of the relief areas 27 increases on the tapered tip 19. By decreasing the concavity of the relief areas from the tip to the shank on the tapered portion provides an increasing surface contact between the screw and the formed threads, which will in turn increase the prevailing torque of the screw and the holding power thereof against loosening of the screw. The reduction in thread depth on the relief areas 23 of the screw body 18 provides a void for galled material and thus prevents the screw from seizing. The void also, especially in cast materials, provides space for material flow which accomplishes stress relief in said materials.

Also, the concavity of the relief areas 27 becomes deeper on the taper tip 19 as the free end 29 of the screw is approached after being generally constant on the screw shank 18 with the change in crest concavity occurring due to the thread rolling operation performed on the blank 10. This increase in concavity is advantageous in performing a thread swaging operation by the screw in an untapped hole where the deeper concavity facilitates the starting of the screw in the unthreaded hole with a minimum of torque.

The length of taper on the tapered end 19 of the threaded screw 17 has been determined to be equal to the pitch of two to three threads to insure uniformity of driving torque and proper fastening.

The screw of the present invention was tested and compared to a commercially available "Type C" screw which is a perfectly round screw without relief areas and has a tapered tip also without relief areas. The tests were performed for drive torque and stripping torque with each screw tested in a cored hole under like conditions with the following results:

TABLE I

| Screw | Inch pounds | |
|---|---|---|
| | Drive torque (average) | Strip torque (average) |
| Type C | 52 | 205 |
| Pentagonal | 26.3 | 154.5 |

The above results are an average based upon ten tests for each screw, the "Type C" screw breaking at the limit of the strip torque while the pentagonal screw of the present invention stripped its threads at the limit of strip torque. Thus, the pentagonal screw has a decided advantage over the "Type C" screw in substantially lowering the initial drive torque required to start the screw and rotate the screw in the hole.

Also, the present pentagonal screw was tested and compared to a Taptite screw, which is a commercially available trilobular screw, for starting torque, strip torque and holding power as shown in the following tables:

TABLE II

| Screw | Inch pounds | |
|---|---|---|
| | Starting torque (average) | Strip torque (average) |
| Taptite No. 8 screw | 5.45 | 58.65 |
| Pentagonal No. 8 screw | 6.3 | 60.3 |
| Taptite No. 10 screw | 8.65 | 68.5 |
| Pentagonal No. 10 screw | 11.35 | 89.9 |

TABLE III

| Screw size | Holding power (pounds) | | Percent increase of pentagonal over taptite |
|---|---|---|---|
| | Taptite | Pentagonal | |
| 8-32 x 1¼ long ind. hex., washer head, cad | 409.9 | 741.6 | 82.7 |
| 10-24 x 1¼ long ind. hex., washer head, cad | 639.5 | 973.5 | 52.3 |

Most fastener authorities today agree that the most important aspect of any mechanical fastening is the amount of tension or holding power developed by the fastener. The Taptite and pentagonal screws were tested using both the Taptite and pentagonal screws in their recommended hole sizes with the tension readings in pounds at the maximum figures reached. The results of the test in both Tables II and III are the average of ten screws of each being tested under identical test conditions.

It can be concluded from the tests that the pentagonal screw of the present invention is far superior to the commercially available trilobular Taptite thread-forming screw. As indicated from the test results, the pentagonal screw develops between 52 percent and 83 percent greater holding power or tension than the Taptite screw, but at the same time, the initial starting or driving torques are very similar and the pentagonal screw also develops higher stripping torques than the trilobular screw.

As an illustrative example of a thread-forming screw formed in accordance with the present invention, a rod is predrawn to a wire diameter of approximately 0.282 inches and extruded in the heading operation to a generally pentagonal shape having flats on the shank of a width of approximately 0.0864 inches with rounded corners of a width of approximately 0.046 inches and a tapered point length of approximately 0.0125 with an angle of taper of approximately 7½ degree. The length of the flat on the tapered end is approximately 0.175 inches and the inscribed circle diameter of the flats equals approximately 0.168 inches. The angle of taper of the flats on the tapered end is approximately 5°33' on a side. The length of the shank of the finished screw having the thread rolled thereon is approximately 0.750 inch. A head of any suitable configuration may be utilized on the screw.

I claim:

1. A thread-forming screw comprising a shank provided with an enlarged head at one end and a tapered tip portion at the opposite end, said shank and tapered tip portion being formed throughout their lengths with five flattened sides defining relief areas intermediate five symmetrically arranged rounded lobes, wherein; both said lobes and said relief areas on said tip portion taper toward the leading end of the screw, a continuous uninterrupted screw thread on said shank and tip portion having a root of circular cross-section and of constant diameter throughout the entire length of the screw, the thread convolutions on the lobes of said shank having a full thread depth and the flattened sides on the shank providing intermediate relief areas with the thread convolutions thereon decreasing in depth from adjacent lobes to a reduced depth intermediate adjacent lobes, said relief areas along the length of the shank having a portion only of their crests concaved with these partial concavities of a generally elliptical shape, the length of taper of said tapered tip portion is 2 to 3 threads, and the thread convolutions on the lobes of the tapered tip portion are gradually reduced in depth toward the end of the tapered tip portion and provided with crests which gradually become concave as the depth of its thread convolutions decreases, and the thread convolutions on the relief areas at the tapered tip portion are gradually reduced in depth with the concavity of these crests being gradually more deeply concave and more elongated as they approach the tip portion of the screw.

2. A thread-forming screw as set forth in claim 1 in which said screw is formed from a blank having a generally cylindrical shank interrupted with circumferentially equally spaced flattened sides defining rounded lobes therebetween, a tapered generally conical tip portion having tapered flattened sides defining tapered rounded lobes therebetween, said sides and lobes on the tip portion being longitudinally aligned with the sides and lobes on the shank, and said thread convolutions are rolled onto the shank and tapered tip portion to form the screw.